United States Patent
Gupta et al.

(10) Patent No.: US 11,929,055 B2
(45) Date of Patent: Mar. 12, 2024

(54) WIND TURBINE WITH TONALITY REDUCTION

(71) Applicant: Vestas Wind Systems A/S, Aarhus N (DK)

(72) Inventors: Mranal Gupta, Tilst (DK); Antonio Patricio Pinto Couto Vieira, Sebolido (PT)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/916,605

(22) PCT Filed: Mar. 29, 2021

(86) PCT No.: PCT/DK2021/050091
§ 371 (c)(1),
(2) Date: Oct. 3, 2022

(87) PCT Pub. No.: WO2021/197558
PCT Pub. Date: Oct. 7, 2021

(65) Prior Publication Data
US 2023/0154448 A1    May 18, 2023

(30) Foreign Application Priority Data
Apr. 3, 2020    (DK) .......................... PA 2020 70210

(51) Int. Cl.
*G10K 11/172* (2006.01)
*F03D 13/20* (2016.01)
*F03D 80/00* (2016.01)

(52) U.S. Cl.
CPC ............ *G10K 11/172* (2013.01); *F03D 13/20* (2016.05); *F03D 80/00* (2016.05); *F05B 2260/96* (2013.01)

(58) Field of Classification Search
CPC ...... F03D 13/20; F03D 80/00; F05B 2260/96; E04H 9/0215
See application file for complete search history.

(56) References Cited

U.S. PATENT DOCUMENTS 6,213,721 B1 * 4/2001 Watkinson .............. F03D 80/00
                                                    416/119
6,422,083 B1 * 7/2002 Hobbs ................... G01M 7/022
                                                    73/1.82

(Continued)

OTHER PUBLICATIONS

Cambonie, Tristan, Bending a quarter wavelength resonator: Curvature effects on sound absorption properites, 2018, Applied Acoustics, 131 (2018) 87-102 (Year: 2018).*

(Continued)

*Primary Examiner* — Eldon T Brockman
(74) *Attorney, Agent, or Firm* — Wood Herron & Evans LLP (57) ABSTRACT

A wind turbine comprising: a vibration source; a component arranged to receive a vibration from the vibration source, the component having a first resonant frequency; and a resonator module arranged to vibrate with a first wavelength when excited at the first resonant frequency, the resonator module being operably coupled to the component at a first location, wherein the resonator module has a first length extending from the first location to a first free end of the resonator module, and wherein the first length of the resonator module is a quarter of the first wavelength.

22 Claims, 12 Drawing Sheets

(56) References Cited

U.S. PATENT DOCUMENTS

| | | | |
|---|---|---|---|
| 8,878,377 B2* | 11/2014 | Ollgaard | F03D 13/20 |
| | | | 290/55 |
| 9,010,506 B2* | 4/2015 | Veit | F16F 7/10 |
| | | | 188/378 |
| 2013/0189105 A1 | 7/2013 | Bonnet | |
| 2013/0220752 A1* | 8/2013 | Veit | F16F 7/10 |
| | | | 188/378 |
| 2013/0259684 A1 | 10/2013 | Hedeen | |
| 2013/0280064 A1* | 10/2013 | van Steinvoren | F03D 13/35 |
| | | | 416/1 |

OTHER PUBLICATIONS

Sakai, Yasunori, Structural damper for auto-damping mechanical components, 2020, Structures, Structures 24 (2020) 864-868 (Year: 2020).*

European Patent Office, International Search Report and Written Opinion in PCT Application No. PCT/DK2021/050091, dated Jun. 29, 2021.

Danish Patent and Trademark Office, Search and Examination Report in PA 2020 70210, dated Sep. 24, 2020.

* cited by examiner

Figure 10

WIND TURBINE WITH TONALITY REDUCTION

FIELD OF THE INVENTION

The present invention relates to a wind turbine and a method of installing a resonator module on a wind turbine.

BACKGROUND OF THE INVENTION

Wind turbines may have multiple sources of vibration, such as generators and gearboxes as well as external surfaces which may suffer from vibrations caused by aerodynamic and/or aeroelastic effects. Such vibrations may cause mechanical resonance within a wind turbine or within components of a wind turbine if the vibrations approach a resonant frequency of the wind turbine or of the component of the wind turbine.

Mechanical resonance may be disadvantageous due to causing vibrations of a significant amplitude, which may lead to structural damage of the wind turbine. A secondary problem is noise pollution caused by resonance when the resonance is at an audible frequency.

SUMMARY OF THE INVENTION

A first aspect of the invention provides a wind turbine comprising: a vibration source; a component arranged to receive a vibration from the vibration source, the component having a first resonant frequency; and a resonator module arranged to vibrate with a first wavelength when excited at the first resonant frequency, the resonator module being operably coupled to the component at a first location, wherein the resonator module has a first length extending from the first location to a first free end of the resonator module, and wherein the first length of the resonator module is a quarter of the first wavelength.

With such an arrangement, the vibration source may induce mechanical resonance in the component, and in turn the component may induce mechanical resonance in the resonator module. The resonator module may vibrate with the same resonant frequency, with a standing wave reflected at the free end, and may then transfer a vibration to the component exactly half a wavelength out of phase with the mechanical resonance in the component. The induced vibration from the resonator module may therefore destructively interfere with the vibration induced by the vibration source such that the magnitude of the vibration in the component may be reduced.

The first location may be at an anti-node of the component when the component is vibrating at the first resonant frequency.

A mechanical impedance of the resonator module may be lower than or equal to a mechanical impedance of the component.

The resonator module may be operably coupled to the component via a magnetic or adhesive coupling means.

The wind turbine may further comprise a connection module, the resonator module may be operably coupled to the component via the connection module, the connection module being configured to couple the resonator module to and decouple the resonator module from the component.

The component may vibrate in a ring mode or a beam mode at the first resonant frequency.

The component may have a curved shape and the resonator module may be operably coupled to the component on an outer surface of the structural component. In particular, the component may be a tower or a blade of the wind turbine having a curved shape and the component may be coupled to the tower or the blade on the outer surface thereof.

The component may have a second resonant frequency, the resonator module may have a second free end, and a second length extending from the first location to the second free end, the resonator module may be arranged to vibrate with a second wavelength when excited at the second resonant frequency, and the second length may be a quarter of the second wavelength.

The resonator module may comprise a rectangular plate. The rectangular plate may have a curvature parallel to a curvature of the component.

The resonator module may be a first resonator module, the component may have a third resonant frequency, the wind turbine may further comprise a second resonator module arranged to vibrate with a third wavelength when excited at the third resonant frequency, the second resonator module may be operably coupled to the component at a second location, and the second resonator module may have a length extending from the second location to a first free end of the second resonator module such that the length of the resonator module is a quarter of the third wavelength.

The first resonator module may extend at least partially over the second resonator module.

The wind turbine may comprise a main tower and a nacelle supported by the main tower, and the component may be the main tower of the wind turbine.

The resonator module may be operably coupled to the main tower such that the resonator module may be arranged to move around a vertical axis of the main tower as the nacelle yaws.

The first location may be at the anti-node of the main tower which is closest to the nacelle when the wind turbine is vibrating at the first resonant frequency.

The wind turbine may comprise a wind turbine blade, and the component may be the wind turbine blade.

The first location may be at the anti-node of the blade which is closest to the blade root when the blade is vibrating at the first resonant frequency.

A second aspect of the invention provides a method of installing a resonator module on a wind turbine, the wind turbine comprising a vibration source and a component arranged to receive a vibration from the vibration source, the method comprising: identifying a first resonant frequency of the component of the wind turbine; providing a resonator module arranged to vibrate with a first wavelength when excited at the first resonant frequency, the resonator module having a first coupling location and a first free end, wherein the resonator module extends from the first location to the first free end such that a length of the resonator module from the first location to the first free end is a quarter of the first wavelength; and operably coupling the resonator module to the component at the first coupling location.

Identifying a first resonant frequency of a component of the wind turbine may comprise performing a numerical simulation of the wind turbine.

Performing the numerical simulation may comprise calculating a position of an anti-node at the first resonant frequency, and wherein the coupling comprises coupling the resonator module to the component at the anti-node.

BRIEF DESCRIPTION OF THE DRAWINGS

Embodiments of the invention will now be described, by way of example only, with reference to the accompanying drawings, in which.

DETAILED DESCRIPTION OF EMBODIMENTS

The term 'vibration source' is used throughout this specification to describe any part of a wind turbine that may induce a vibration in itself and/or in another component. The vibration may be induced by any movement of the vibration source, such as through mechanical rotation, through aerodynamic effects such as vortex shedding or through aeroelastic effects such as gallop. For example, the vibration source may be a generator, and/or a gearbox of the wind turbine. The vibration source may alternatively be a surface of a blade, a nacelle or a tower of the wind turbine, with vibration being induced by wind incident on the vibration source. The vibration source may vibrate at a range of frequencies, and a resonant frequency of the component may be one of the frequencies at which the vibration source vibrates.

As used in this specification, a resonant frequency of an object is a natural frequency of vibration determined by the physical parameters of the vibrating object. An object excited by a vibration source vibrating at a resonant frequency of the object may vibrate with an amplitude higher than if it is excited at other frequencies. An object may have more than one resonant frequency. First, second, third, etc. in the context of resonant frequencies in this application are merely labels and not intended to describe the harmonic properties themselves. For example, the first resonant frequency may be the frequency of the fundamental harmonic (i.e. $1^{st}$ harmonic) of the component or of the first overtone (i.e. $2^{nd}$ harmonic).

A component vibrating at a resonant frequency will vibrate with a particular waveform. In this waveform, some regions of the component will vibrate with a high amplitude and some regions will vibrate with a low amplitude. A region of high amplitude vibration is known as an anti-node and a region of low amplitude vibration is known as a node.

The term operably coupled used herein is intended to encompass any coupling arrangement that may transfer vibration energy to and from the resonator module.

Any component of a wind turbine may undergo resonance. In particular, the tower of a wind turbine and the blades of a wind turbine are components of a wind turbine that may experience resonance.

Figure 1:
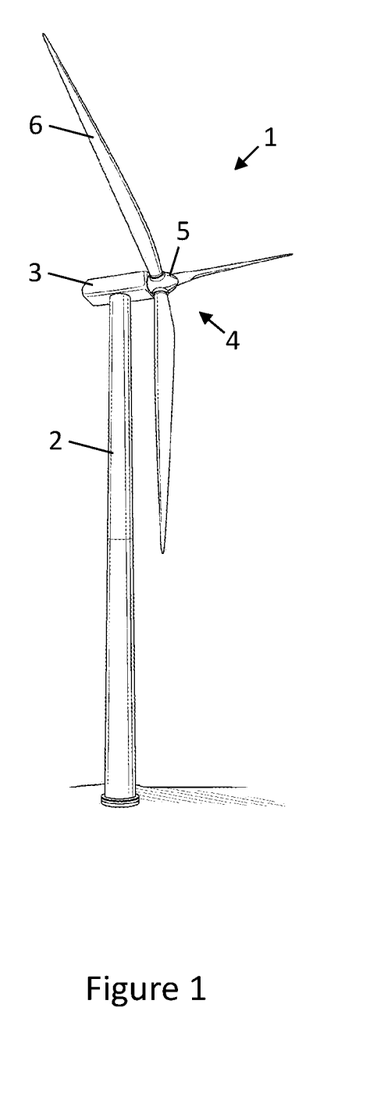
FIG. 1 illustrates, in a general view, an example of a wind turbine.

FIG. 1 shows a wind turbine 1. The wind turbine 1 includes a tower 2, a nacelle 3 supported by the tower 2 at the apex of the tower, and a rotor 4 rotatably mounted on the nacelle 3. The rotor 4 of the wind turbine has a central hub 5 and a plurality of blades 6 that project radially outwardly from the central hub 5. In the illustrated embodiment, the rotor 4 has three blades 6, but the number of blades may vary.

The rotor 4 may rotate when wind acts on the blades 6 of the rotor 4. The rotor may be coupled to a generator housed inside the nacelle 3 and arranged to transmit rotational motion to the generator. The rotor 4 may be coupled to the generator via a gearbox. In addition to the generator and/or the gearbox, the nacelle 3 may house other components for operating and monitoring the wind turbine 1.

The tower 2 may be excited at a range of frequencies by a vibration source, such as the wind acting on the wind turbine 1, the generator, and/or the gearbox. The tower 2 may have many resonant frequencies. When the tower 2 is excited at a resonant frequency, the tower 2 may vibrate at that resonant frequency. One or more of the resonant frequencies may be audible frequencies. These audible frequencies may exceed certain regulated noise limitations or may damage the tower 2. The tower 2 may also be called a main tower.

Figure 2A:
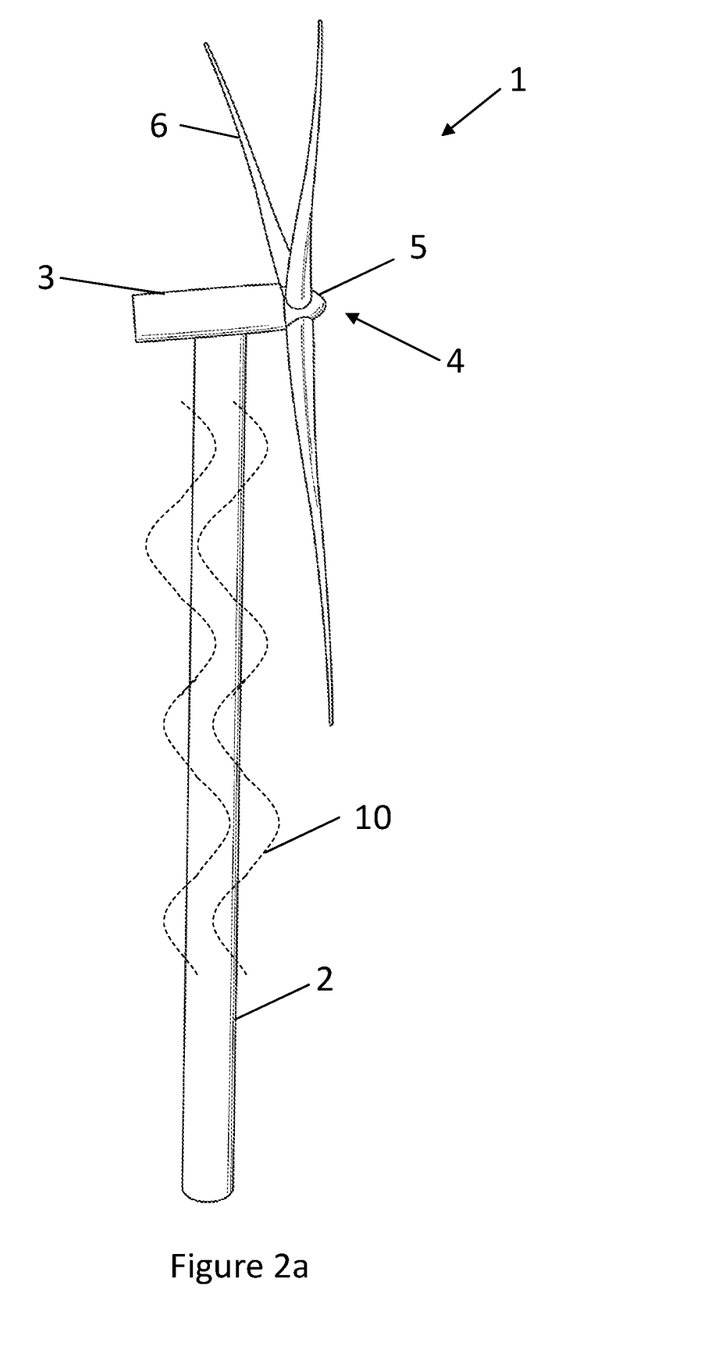
FIG. 2a illustrates, in a general view, an example of a wind turbine tower vibrating with a beam mode.

As shown in FIG. 2a the tower 2 may vibrate with a beam mode 10. For analysing the beam vibration mode, the tower 2 may be considered as a beam fixed at the foundation and free at the apex. The tower 2 may be displaced horizontally by a vibration in a beam mode. The horizontal displacement of the tower 2 may travel vertically along the tower 2 in the form of a wave.

Figure 2B:
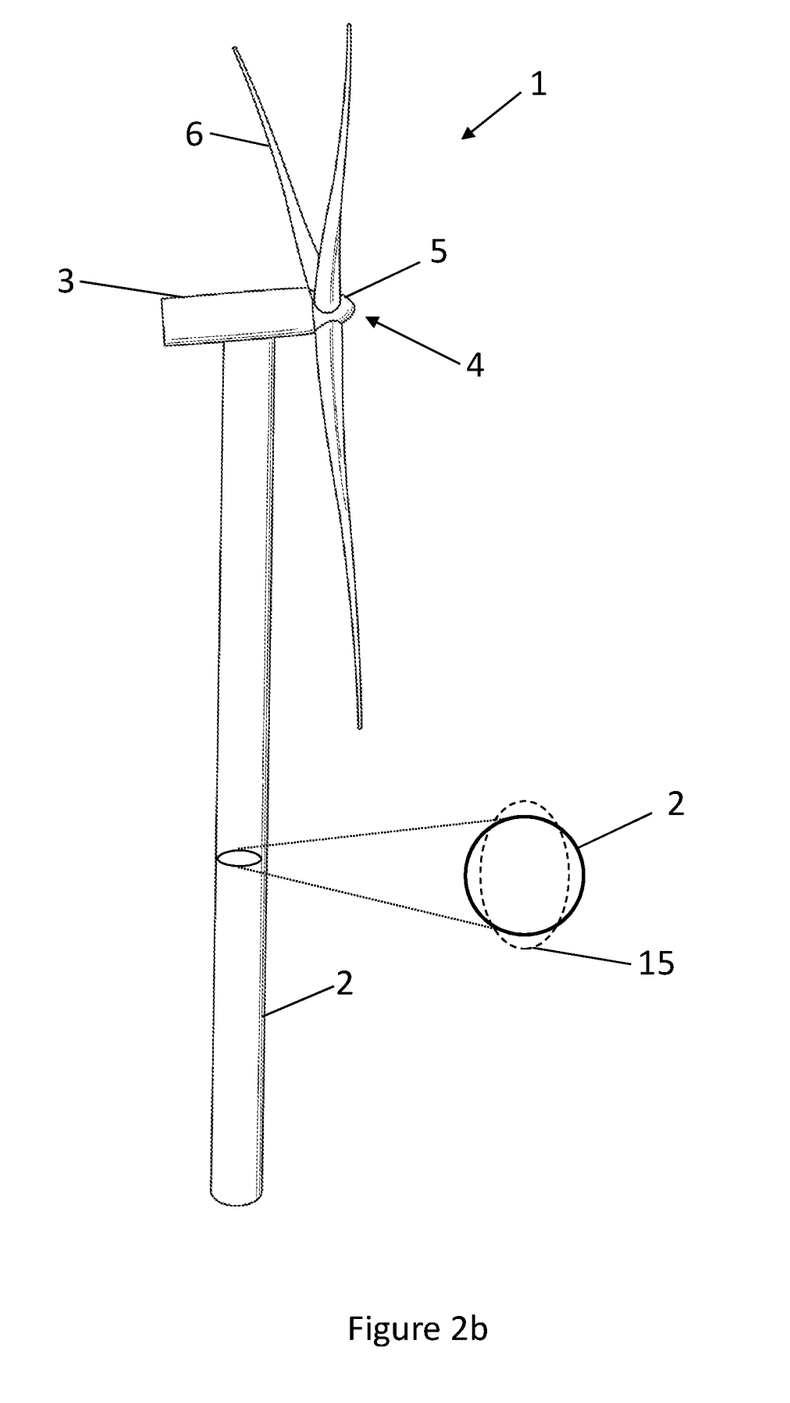
FIG. 2b illustrates, in a general view and a cross sectional view, an example of a wind turbine tower vibrating with a ring mode.

As shown in FIG. 2b the tower 2 may vibrate with a ring mode 15. In a ring vibration mode, the cross section of the tower 2 may be deformed. For example, the tower 2 may have a circular cross section, and this may become elliptical under stress. The deformation may travel as a wave across a cross section of the tower 2.

The tower 2 may also vibrate with a slant vibration mode, which may appear as a wave travelling diagonally across the tower. A slant vibration mode is a combination of a beam mode 10 and a ring mode 15.

It will be understood that it is not only the tower 2 of the wind turbine 1 which may have a resonant frequency and may vibrate. Indeed, many components of the wind turbine may respond in similar ways to the tower 2 discussed above. Examples of other components include at least the blades 6 of the wind turbine 1. Each blade 6 of the wind turbine 1 may be excited at a range of frequencies by a vibration source, such as, the wind acting on the blade 6, the generator, and/or the gearbox. The blades 6 may each have multiple resonant frequencies. When the blades 6 is excited at a resonant frequency, the blades 6 may vibrate at that resonant frequency. A resonant frequency may be an audible frequency. These audible frequencies may exceed certain noise restrictions or may damage the blades 6.

Figure 3:
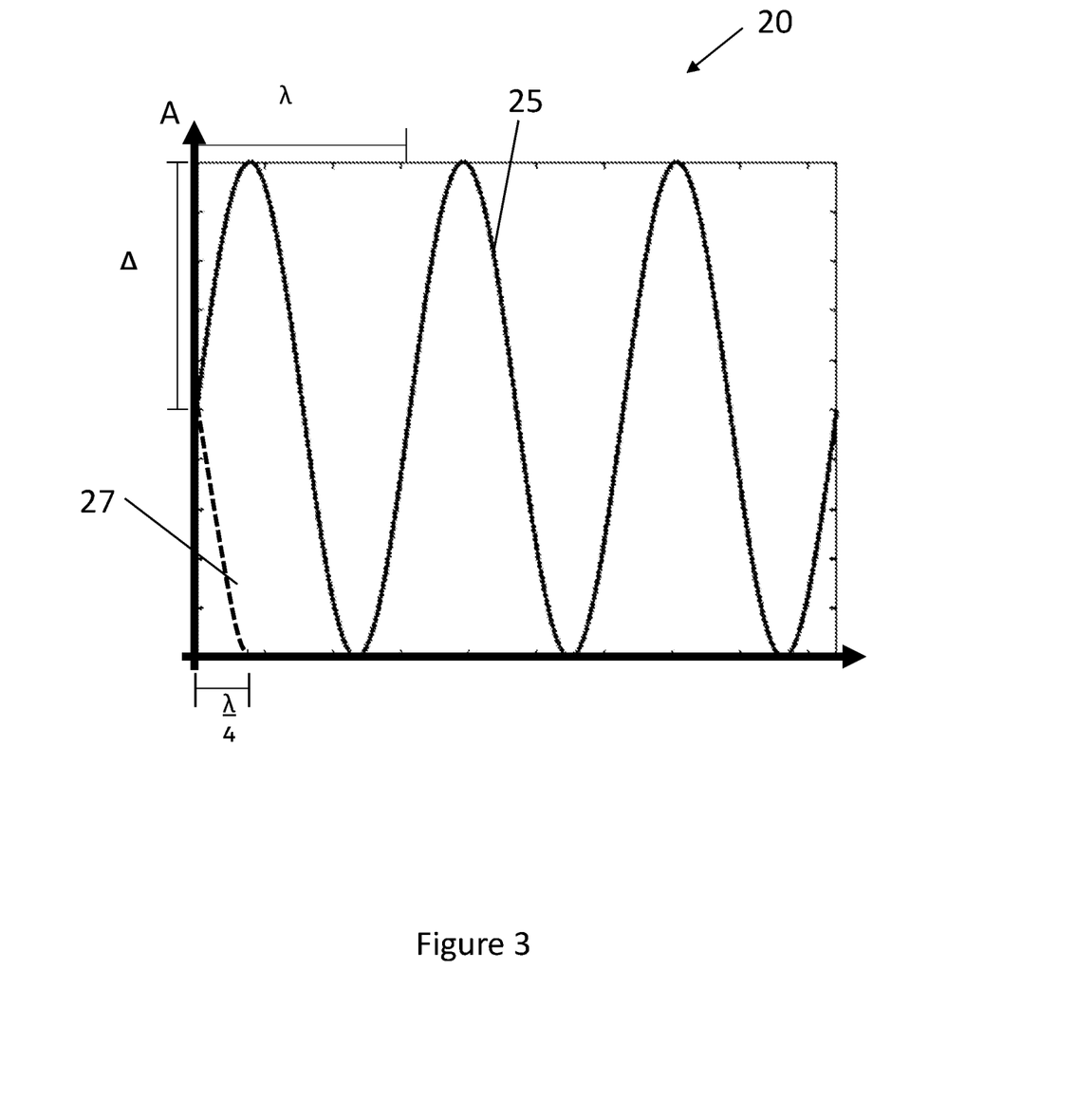
FIG. 3 is a graph demonstrating the phase principle of the resonator module.

FIG. 3 is a graph showing a sine wave 25 representing a component vibrating at a wavelength λ, with an amplitude Δ. A second line 27 has a similar, opposite amplitude and extends to a maximum over a length equivalent to one quarter of the wavelength of the sine wave (λ/4).

The second line 27 represents the sine wave 25 after having travelled from an initial point on the component along a resonator module which is a quarter wavelength long and reflected by the end of the resonator module back to the initial point. When at the initial point, the wave will have travelled a distance equal to half the wavelength and will therefore be in the opposite phase to the original sine wave 25. It will be understood that combining the line 27 and the sine wave 25 may result in a wave substantially smaller than the sine wave. This phenomenon is known as destructive interference.

In order to reduce the magnitude of vibrations of a component at a particular frequency, a resonator module may be operably coupled to the component.

FIGS. 4a to 4d illustrate the operating principle of such a resonator module 30 when fixed to a generic component C. It will be understood that all principles and features described in combination with the generic component C may be applied to a specific component of a wind turbine 1, such as a main tower 2 or a blade 6.

In the example shown the component C is vibrating with a sinusoidal, beam bending motion M. However, the operating principle equally applies to any other vibration mode, such as ring modes and slant vibration modes.

The beam bending motion M has a first frequency. The resonator module 30 is operably coupled to the component C at a first location 31. The resonator module 30 has a first length L extending from the first location 31 to a first free end 36 of the resonator module 30.

The first length L of the resonator module 30 is a quarter of the wavelength $\lambda$ of the vibration induced in the resonator module 30 by the motion M at the first frequency, i.e. length L equals $\lambda/4$. The first length L is the distance along the resonator module 30 from the first location 31 to the free end 36, i.e. the distance that the wave travels along the resonator module 30.

As explained below with reference to FIG. 5a, the resonator module 30 may have an L-shape, with a first portion parallel to the component C and a second portion extending between the first portion and the component C. The first portion may be significantly longer than the second portion and the length of the resonator may therefore be estimated as the length of the first portion, denoted L in FIGS. 4a to 4d. The relevant length for the function of the resonator module 30 is the length that determines the time taken for a wave to travel from the first location 31 to the free end 36.

Figure 4A:
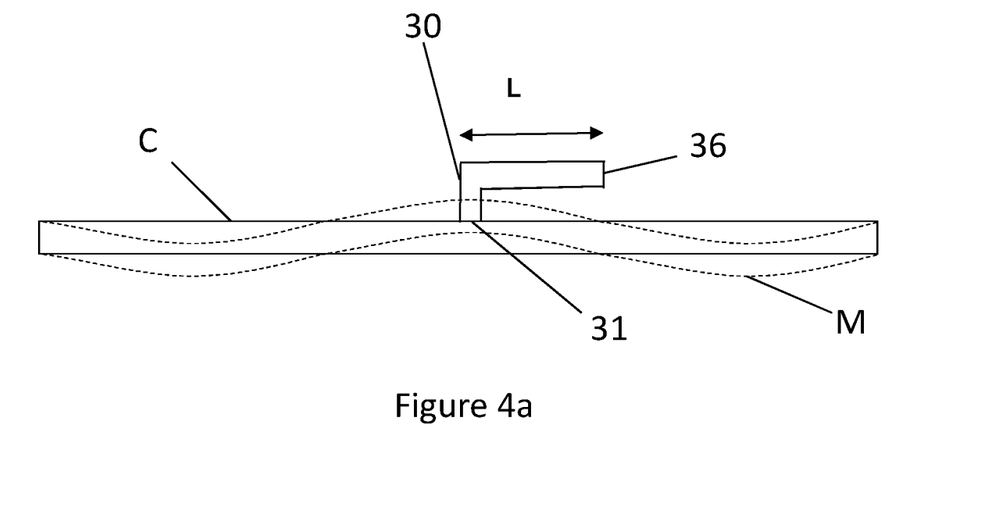
FIGS. 4a-4d illustrate the operating principle of the resonator module attached to a vibrating component.

FIG. 4a shows the component C vibrating at a first resonant frequency with motion M. The resonator module 30 may be operably coupled to the component C at an anti-node of the component C at the first resonant frequency. Coupling the resonator module 30 to the component C at an anti-node advantageously may result in an improved reduction in amplitude of the vibration of the component C by making the vibration introduced to the component C from the resonator module close to being exactly out of phase (i.e. half a wavelength out of phase). Thus, it may improve the effectiveness of the resonator module 30.

Figure 4B:
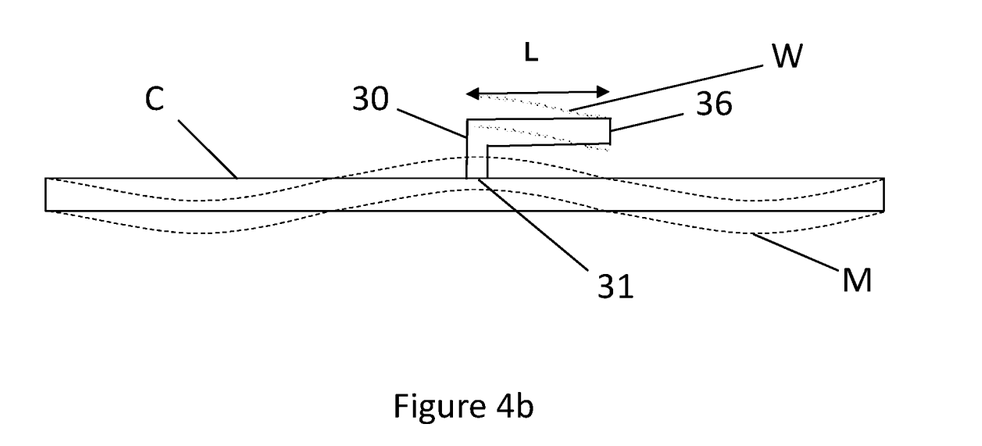

As shown in FIG. 4b, the resonator module 30 is arranged to vibrate with a first wavelength W when excited at the first resonant frequency by the component C. The resonator module 30 may have a low mechanical impedance and may in particular have a mechanical impedance lower than the mechanical impedance of the component C. The mechanical impedance may be determined by the material and the structure of the resonator module 30 and may vary with frequency. The mechanical impedance can be determined by numerical simulation or from basic principles using known equations.

This may be beneficial as this arrangement may allow more vibrational energy to be transferred into the resonator module 30 than if the mechanical impedance of the resonator module 30 was higher than the mechanical impedance of the component C. It is generally easier to adapt or change the mechanical impedance of the resonator module 30 because the mechanical impedance of the component C may be predetermined due to its function.

An example of a material used to form the mechanical resonator 30 is a metal (e.g. steel or aluminium), carbon fibre, or a different composite material. Examples of different structures will be exemplified later, but generally the mechanical resonator may be elongate and have the form of a plate.

FIG. 4b shows a proportion of the vibration energy of the sine wave motion M of the component C being transferred to the resonator module 30 as resonator module vibration W. As the first length of the resonator module 30 is one quarter of a wavelength ($\lambda/4$) long, the sine wave motion W has an extent of $\lambda/4$ within the resonator module 30. It will be understood that, due to different material and/or structural properties of the resonator module 30 as compared to the component C, the wavelength of the vibration W in the resonator module 30 may be different from the wavelength of the vibration M in the component C, while both may be excited with the same frequency. The first length L of the resonator module 30 may therefore be one quarter of the wavelength of the vibration W within the resonator module 30, for the reasons explained below.

Figure 4C:
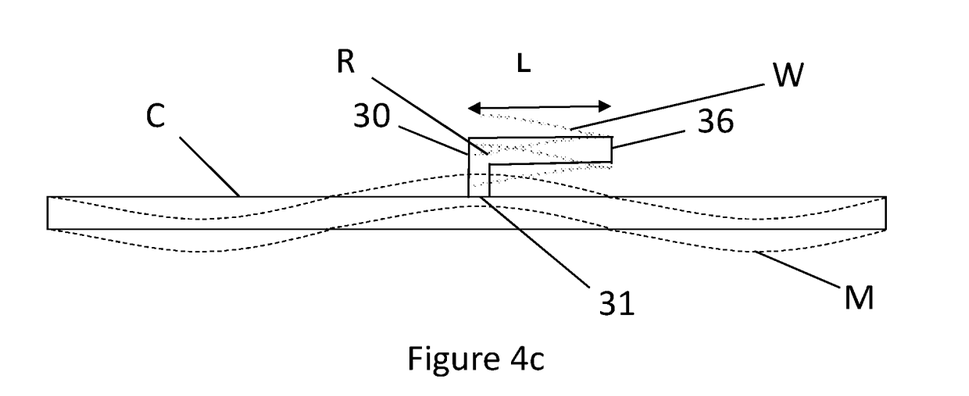
Figure 4D:
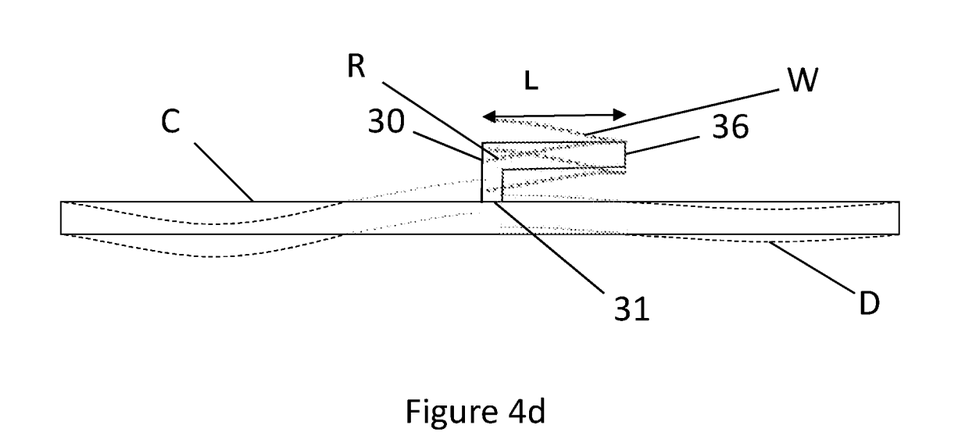

FIG. 4c shows that as the resonator module 30 vibrates the resulting phase change of the resonator module 30 vibration at the first location 31 is half a wavelength ($\lambda/2$) in comparison to the sine wave motion M of the component C. This can be visualised as the resonator module 30 carrying the partial sine wave motion W and reflecting it at the first free end 36 back to the first location 31 to form reflected partial sine wave motion R. The resulting effect may be destructive interference between the vibration in the component C and the resonator module 30 vibration at the first location 31. This results in an amplitude reduction of the sine wave motion M in the component 30 as shown by the reduced wave D, in FIG. 4d. A reduction in sine wave amplitude correlates to a reduction in movement of the component C and of audible noise from the component C.

FIGS. 5a to 5d show different resonator modules operably coupled to a surface of the tower 2. The resonator modules may be positioned on either the outer side wall of the tower 2 or the inner (the typically enclosed) side wall of the tower 2. In general, coupling resonator modules to the outer surface may reduce construction complexity and may provide an arrangement which is easier to retrofit to existing wind turbines.

The different examples of resonator modules are also suitable to be operably coupled to a blade 6 or other component of the wind turbine 1.

The first location 31, at which the resonator module is coupled to the tower, 2 may be at the anti-node of the first harmonic of the tower 2 which is closest to the nacelle 3, when the wind turbine 1 is vibrating at the first resonant frequency. It has been shown generally that the largest reductions in audible noise result when the first location 31 is the anti-node closest to the source of the vibrations. Similarly, if the component is a blade 6, then the first location 31 may be at the anti-node of the first harmonic of the blade 6 which is closest to the blade root, where the blade couples to the nacelle 3.

Figure 5A:
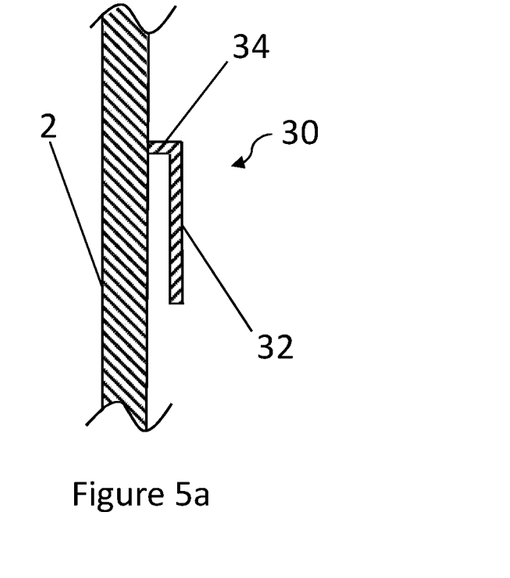
FIGS. 5a-5d illustrate, in cross-sectional views, examples of resonator modules.

FIG. 5a shows an example of a resonator module 30 operably coupled to the tower 2. The resonator module 30 has a first portion 32 which may be a planar plate parallel to the tower 2. Although not shown, this first portion 32 may be curved so to be complementary to the curvature of the tower 2, such that the first portion 32 maintains a constant distance from the tower 2 when neither is vibrating. The resonator module 30 also has a second portion 34 perpendicular to the tower 2 which may distance a first portion 32 from the tower 2 to enable it to freely vibrate. The length of the resonator module 30 may be the sum of the lengths of the first and second portions 32, 34.

Alternatively, the length of the resonator module 30 may be estimated as the length of the first portion 32.

Figure 5B:
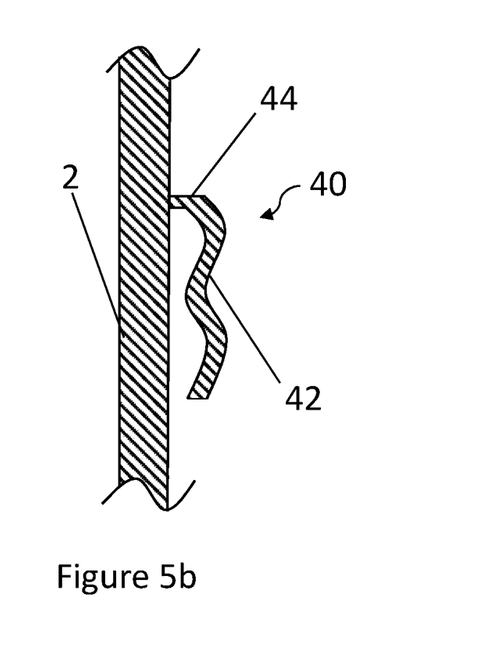

FIG. 5b shows an example of a resonator module 40 with a sinusoidal portion 42. The second portion 44 of the resonator module 40 may be substantially similar to the second portion 34 of the resonator module 30 shown in FIG. 5a. The first length (i.e. λ/4) of the resonator module 40 may be defined as the sum of the length along the sinusoidal portion 42 and the length of the second portion 44. Therefore, the resonator module 40 of FIG. 5b may have a shorter extent along the tower 2 than the resonator module 30 of FIG. 5a, if the two resonator modules are arranged to resonate at the same frequency. The resonator module 40 shown in FIG. 4b may therefore provide a more compact arrangement. The resonator module 40 may alternatively have a non-sinusoidal curved shape while still providing a compact arrangement.

Figure 5C:
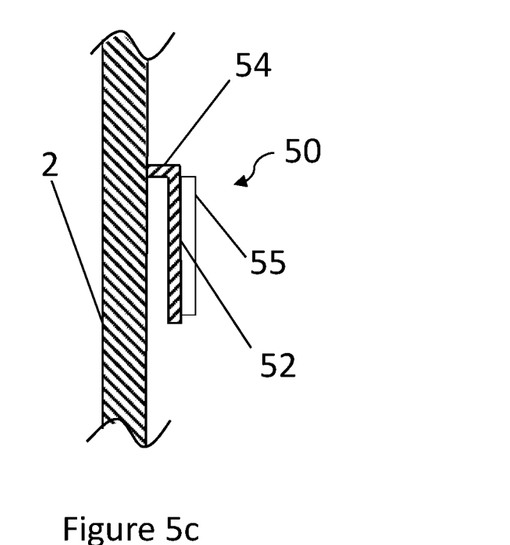

As a result of a resonator module vibrating, the resonator module may also create audible noise. It may be advantageous to provide a resonator module 50 with dampening material 55. FIG. 5c shows a resonator module 50 with dampening material 55 attached to the first portion 52. The dampening material 55 may advantageously damp the audible noise generated by the resonator module 50 and may thereby provide a quieter resonator module. The dampening material 55 may be coupled on either side of the resonator module. Alternatively, the dampening material may be coupled to the tower 2.

Figure 5D:
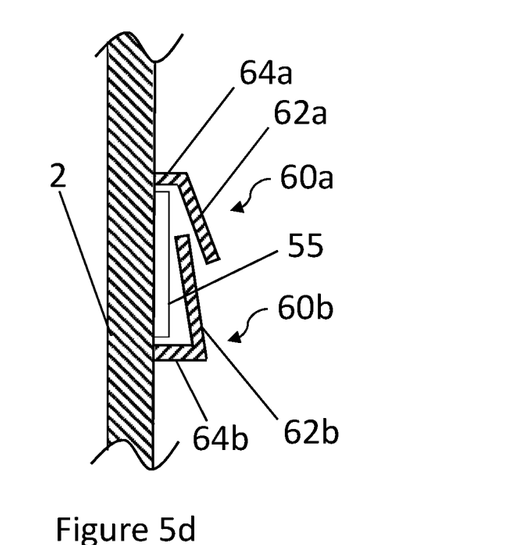

An example of a tower 2 comprising two resonator modules 60a, 60b is shown in FIG. 5d. The arrangement shown comprises two resonator modules: a first resonator module 60a; and a second resonator module 60b. The first resonator 60a comprises a first portion 62a and a second portion 64a. The second resonator 60b comprises a first portion 62b and a second portion 64b. The first portions 62a, 62b, and second portions 64a, 64b function similarly to the first portion 32 and second portion 34 of resonator module 30 respectively. The first resonator module 60a partially overlaps the second resonator module 60b. The resonator arrangement also comprises dampening material 55 attached to the tower 2 and covered by the first and the second resonator modules. The arrangement shown in FIG. 5d may advantageously reduce audible noise by a greater amount than an arrangement with two resonator modules that do not overlap, since sounds emitted from the second resonator module 60b may be attenuated by the first resonator module 60a. The resonator arrangement may therefore be particularly advantageous when operatively coupled to the outer surface of the tower 2.

Each resonator module 60a, 60b may be arranged to vibrate with a different wavelength. Where multiple resonator modules 60a, 60b are operably coupled to a single tower 2 they may be positioned at different axial locations along the tower 2.

By providing two resonator modules having different lengths, the first resonator module may be arranged to vibrate with a first wavelength when excited by the first resonant frequency of the tower 2 and the second resonator module may be arranged to vibrate with a second wavelength when excited at a second resonant frequency of the tower 2. Resonant vibrations may therefore be reduced at a greater range of frequencies.

The first resonator module may be operably coupled to the tower 2 at a first location, and the second resonator module may be operably coupled to the tower 2 at a second location. Each resonator module may therefore be coupled to the tower 2 at an anti-node of the resonant vibration mode to which it is tuned by the selection of its length.

A resonator module may be rod shaped i.e. substantially 1-dimensional. However, it may have a plate like shape i.e. substantially 2-dimensional. A resonator module may advantageously have a first length several times greater than its thickness, which may allow a resonator module to vibrate more easily, i.e. to have a lower mechanical impedance.

Figure 6A:
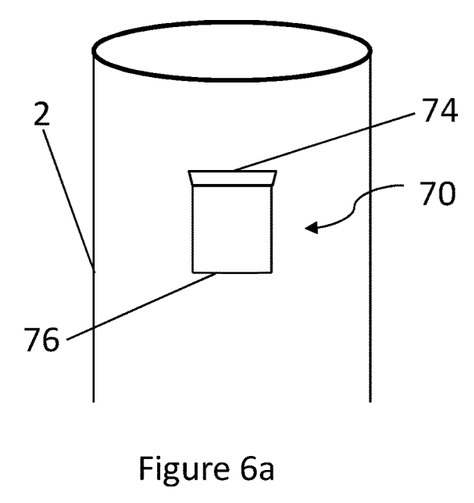
FIGS. 6a-6c illustrate, in general views, examples of resonator modules.

As shown in FIG. 6a, a resonator module 70 may comprise a rectangular plate. The resonator module 70 is coupled to the tower 2 along a first coupling location edge 74, and has a first free end edge 76 which is parallel to the first coupling location edge 74. Hence, the first length from the first location to the first free end may be the same along the entire width of the resonator module 70.

Figure 6B:
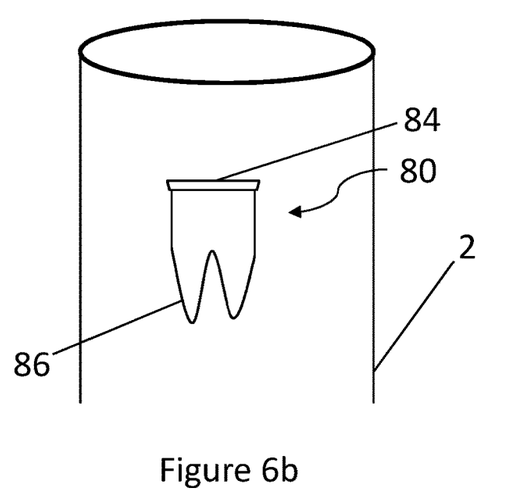

FIG. 6b shows a resonator module 80 coupled to the tower 2 along a first coupling location edge 84 and having a curved free end 86. The effect of the curved free end 86 is that the resonator module 80 effectively has multiple lengths (by having multiple free ends located at different distances from the first location edge). By providing different lengths and differently located free ends, the resonator module 80 may have multiple different resonant frequencies and may therefore reduce resonant vibrations at a wider range of frequencies.

Figure 6C:
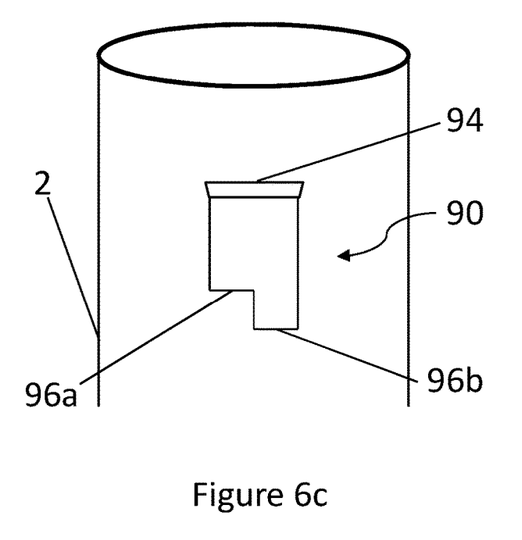

FIG. 6c shows a resonator module 90 which is coupled to the tower 2 by a first location edge 94 and has two free end edges 96a, 96b. The resonator module 90 has a distinct first free end edge 96a and a distinct second free end edge 96b, and has a first length and a second length extending from the first location edge 96 to the first free edge 96a and to the second free end edge 96b respectively. The resonator module 90 is therefore arranged to vibrate with a first and a second wavelength when excited at first and second resonant frequencies. The first length is a quarter of the first wavelength, and the second length is a quarter of the second wavelength. The resonator module 90 may therefore reduce vibrations at two distinct resonant frequencies, but requires only a single attachment point.

It will be understood that features of the resonator modules shown in FIGS. 5a to 5d and feature of the resonator modules shown in FIGS. 6a to 6c may be combined as appropriate in a straightforward manner.

Figure 7:
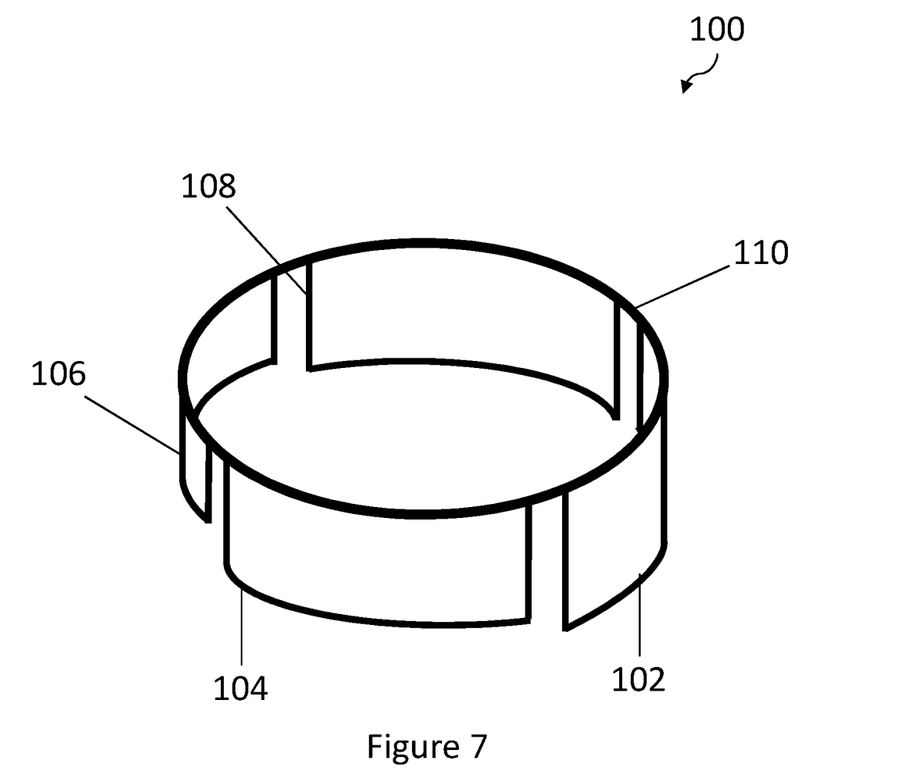
FIG. 7 illustrates, in a general view, an example of an attachment comprising four resonator modules.

FIG. 7 shows a resonator arrangement 100 comprising four resonator modules 102, 104, 106, 108. All four resonator modules 102, 104, 106, 108 are rectangular plates which have a complementary curvature such that the plates are parallel to a curvature of the tower 2 to which they are arranged to be attached. All four resonator modules 102, 104, 106, 108 may have a constant cross section and may have surfaces formed as a continuous curve. Therefore, a resonator module may comprise a curvature such that it is parallel to a curvature of the component to which it shall be operably coupled.

All four resonator modules 102, 104, 106, 108 are shown to share a coupling ring 110. The coupling ring 110 is arranged to operably couple the resonator modules 102, 104, 106, 108 to the inside surface of the tower 2, although it may analogously be coupled to a blade 6 other component of the wind turbine 1. It will be seen that all resonator modules 102, 104, 106, 108 may be different lengths, such that each resonator module 102, 104, 106, 108 may be arranged to vibrate with a respective wavelength when excited at a respective resonant frequency.

In the example of FIG. 7, two resonator modules 102, 108 are arranged to vibrate with a particular wavelength when the tower 2 vibrates in a ring mode and two resonator modules 104, 106 are arranged to vibrate with a particular wavelength when the tower 2 vibrates in a beam mode. By providing multiple resonator modules on a single coupling ring, there may be provided a simpler means to install several resonator modules on a wind turbine 1.

Figure 8A:
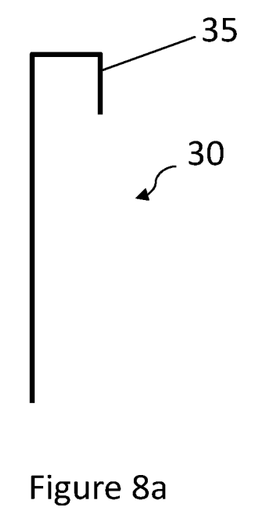
FIGS. 8a-8d illustrate, in a profile views, examples of resonator modules with different connection means.

FIG. 8a shows a profile view of a resonator module 30 with a coupling flange 35 that improves how the resonator module 30 may be coupled to another component. By providing a coupling flange 35, the position at which the resonator module 30 may be coupled to another component may be varied, such as to couple the resonator module 30 to the component at a first location closer to an anti-node. The resonator module 30 may be coupled to the component by conventional means such as bolts, screws, or the like.

Figure 8B:
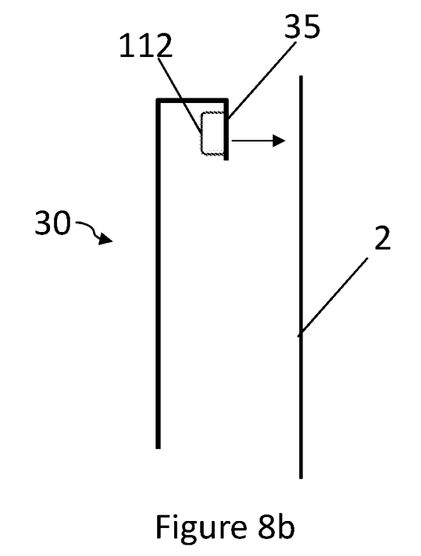

FIG. 8b shows a magnet 112 coupled to the resonator module 30 at the coupling flange 35. The magnet 112 enables an operable coupling between the resonator module 30 and the tower 2 or a different component, as long as there is some ferromagnetic material within the component to which the resonator module 30 is coupled. Ferromagnetic material may be bonded to a surface of the component in order to allow the resonator module to be attached via a magnet.

Figure 8C:
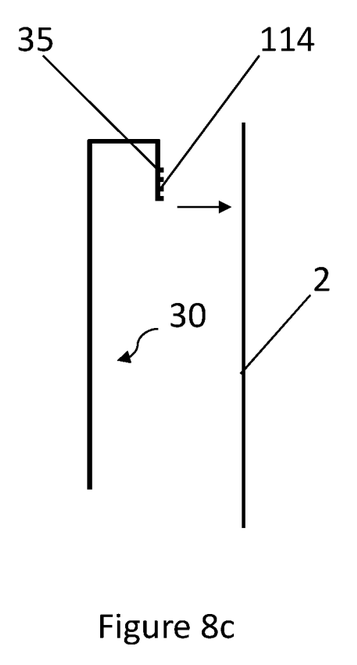

FIG. 8c shows an adhesive 114 coupled to the resonator module 30 at the coupling flange 35. The adhesive 114 enables an operable coupling between the tower 2 and the resonator module 30. This is advantageous if the tower 2 comprises composite material since it does not compromise the structural integrity of the tower 2. An adhesive 114 may also enable fast coupling of the resonator module 30 to the tower 2.

Figure 8D:
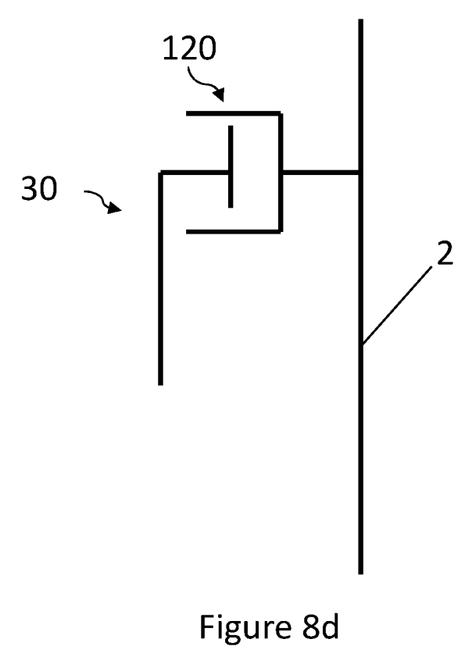

As shown in FIG. 8d, the wind turbine 1 may comprise a connection module 120, the resonator module 30 being operably coupled to the tower 2 via the connection module 120. The connection module 120 may be configured to couple the resonator module 30 to and decouple the resonator module 30 from the tower 2.

As components, such as a tower 2, are generally complex structures with many resonant frequencies, it may be the case that at a first resonant frequency the resonator module 30 efficiently reduces vibration in the tower 2, however, at a second resonant frequency the resonator module 30 may not reduce or may even increase the vibration in the tower 2. In this case the connection module 120 advantageously allows the resonator module 30 to couple to and decouple from the tower 2 selectively. The connection module 120 may be actuated remotely and/or by an automated system.

At some orientations around the vertical axis of the tower 2 the resonator module 30 may more efficiently reduce vibrations in the tower 2. Therefore, the resonator module 30 may be operably coupled to the tower 2 such that the resonator module 30 moves around a vertical axis of the tower 2. In particular, the resonator module 30 may be arranged to move around the tower 2 with the nacelle 3 as the nacelle 3 rotates to point the rotor 4 upwind.

The yawing of the resonator module 30 may be achieved either by connecting the resonator module 30 to the yaw-beams and/or base frame of the wind turbine 1, in particular to the nacelle 3 of the wind turbine 1, or it may be achieved by providing a separate rotational actuator for the resonator module 30.

Figure 9:
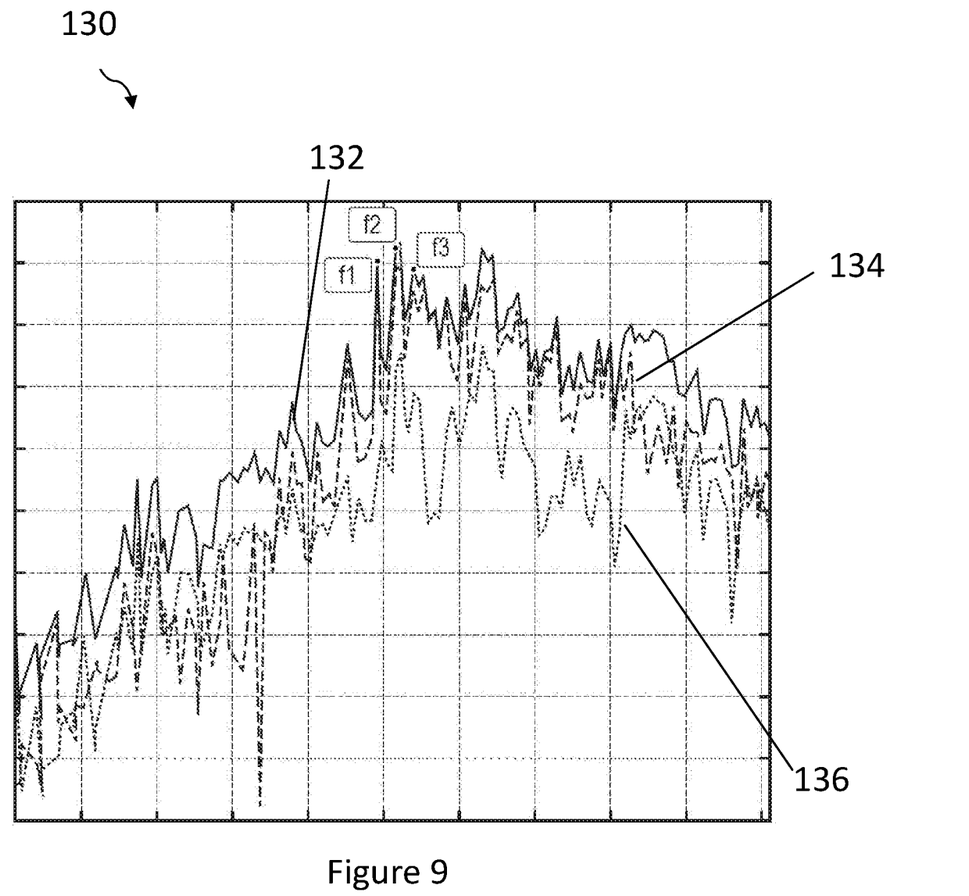
FIG. 9 is a graph showing frequency against audible noise for a component of a wind turbine without a resonator module.

FIG. 9 is a graph 130 showing acoustic nose produced by a wind turbine. The graph 130 shows frequency on the x-axis and acoustic noise on the y-axis. In order to provide a suitable resonator module 30, an identification task may be undertaken. This task may provide an artificial vibration source to the wind turbine 1 and sweep a range of frequencies while recording noise volume from a fixed location. The exact location or noise threshold may depend on the application and desired volume of the wind turbine 1. The method of taking the measurements similar to those shown in FIG. 9 would be apparent to one skilled in the art.

An alternative to taking measurement is to perform a numerical simulation of the wind turbine 1. Such a numerical simulation may directly identify a first harmonic of a component of a wind turbine.

The solid line 132 in FIG. 9 shows the total noise from the wind turbine 1 at a range of frequencies of interest. The dashed line 134 in FIG. 9 shows the total noise from the tower 2 at a range of frequencies of interest. The dashed line 136 in FIG. 9 shows the total noise from a blade 6 at a range of frequencies of interest.

From an analysis producing the graph shown in FIG. 9, peak noise signals can be identified, for example frequencies f1, f2, and f3. Frequency f1 is a first resonant frequency for which a resonator module can be provided. The resonator module should be in resonance when excited at frequency f1 and that resonance should have a wavelength of which the length of the resonance module is one quarter. The same analysis and resonator module construction may additionally or alternatively be carried out for f2 and f3.

Moreover, performing a numerical simulation may comprise calculating a position of an anti-node of the first harmonic. Once the position of an anti-node is found, the resonator module 30 may be coupled to the component at the anti-node. Alternatively, an anti-node may be found by observing the component and measuring movement using accelerometers.

Figure 10:
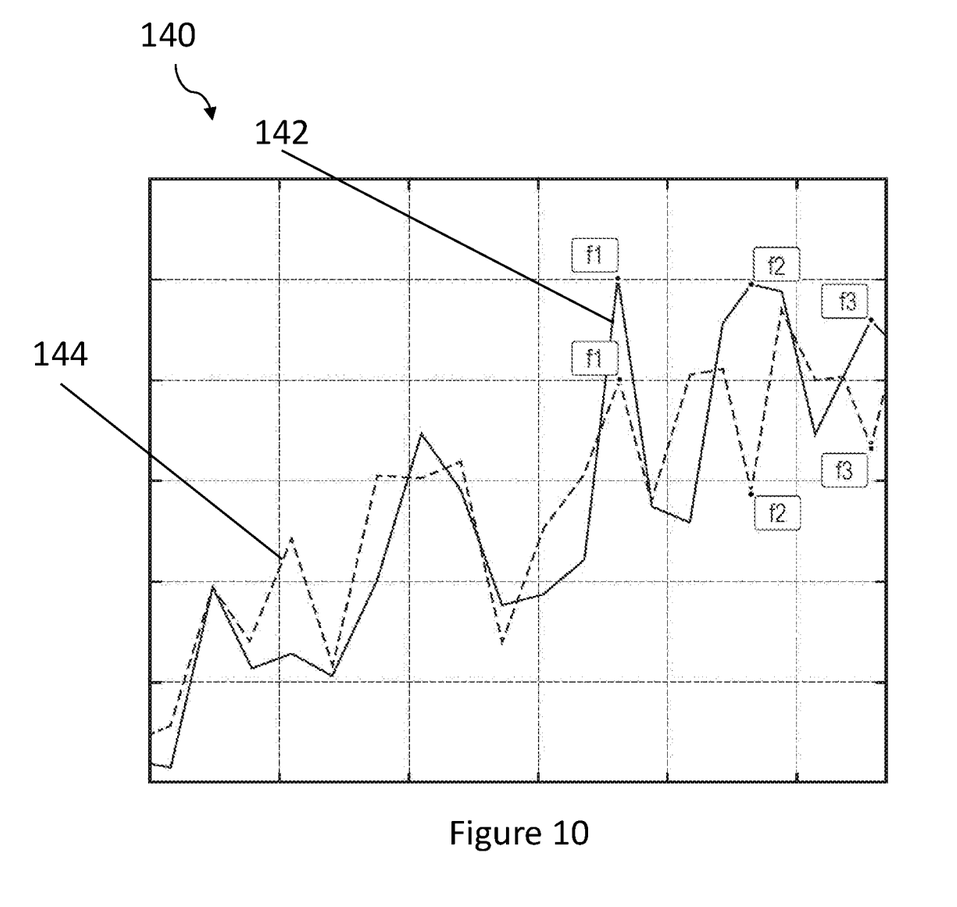
FIG. 10 is a graph showing frequency against audible noise for a component of a wind turbine with and without a resonator module.

FIG. 10 is a graph 140 showing acoustic nose produced by a wind turbine tower 2 before and after installation of one or more resonator modules. The graph 140 shows frequency on the x-axis and acoustic noise on the y-axis. Note that the frequency range of graph 140 is smaller than the frequency range of graph 130 for illustrative purposes. The noise generated by a tower 2 without a resonator module is shown by solid line 142, and the noise generated by a tower with a resonator module is shown by dashed line 144. The difference in noise generated can therefore be seen from FIG. 10. It can be seen that for the target frequencies f1, f2, and f3 the noise is reduced significantly. This may be achieved by multiple resonator modules, or by a single resonator module with multiple resonant frequencies.

It may be the case that due to the complex structures within a component, such as a tower 2 or a blade 6, multiple resonant frequencies may have a common wavelength and therefore only a single resonator module 30 may be required for attenuating noise at many different frequencies.

Although the invention has been described above with reference to one or more preferred embodiments, it will be appreciated that various changes or modifications may be made without departing from the scope of the invention as defined in the appended claims.

The invention claimed is:

1. A wind turbine comprising:
   a vibration source;

a component arranged to receive a vibration from the vibration source, the component having a first resonant frequency; and a resonator module arranged to vibrate with a first wavelength when excited at the first resonant frequency, the resonator module being operably coupled to the component at a first location, wherein the resonator module has a first length extending from the first location to a first free end of the resonator module, and wherein the first length of the resonator module is a quarter of the first wavelength to reflect a partial sine wave motion of the first wavelength from the first free end of the resonator module back to the component at the first location.

2. The wind turbine of claim 1, wherein the first location is at an anti-node of the component when the component is vibrating at the first resonant frequency.

3. The wind turbine of claim 1, wherein a mechanical impedance of the resonator module is lower than or equal to a mechanical impedance of the component.

4. The wind turbine of claim 1, wherein the resonator module is operably coupled to the component via a magnetic or adhesive coupling means.

5. The wind turbine of claim 1, further comprises a connection module, the resonator module being operably coupled to the component via the connection module, the connection module being configured to couple the resonator module to and decouple the resonator module from the component.

6. The wind turbine of claim 1, wherein the component vibrates in a ring mode or a beam mode at the first resonant frequency.

7. The wind turbine of claim 1, wherein the component has a curved shape and wherein the resonator module is operably coupled to the component on an outer surface of the component.

8. The wind turbine of claim 1, wherein the component has a second resonant frequency, wherein the resonator module has a second free end, and a second length extending from the first location to the second free end, wherein the resonator module is arranged to vibrate with a second wavelength when excited at the second resonant frequency, and wherein the second length is a quarter of the second wavelength.

9. The wind turbine of claim 1, wherein the resonator module comprises a rectangular plate.

10. The wind turbine of claim 9, wherein the rectangular plate has a curvature parallel to a curvature of the component.

11. The wind turbine of claim 1, wherein the resonator module is a first resonator module, wherein the component has a third resonant frequency, wherein the wind turbine further comprises a second resonator module arranged to vibrate with a third wavelength when excited at the third resonant frequency, the second resonator module being operably coupled to the component at a second location, and wherein the second resonator module has a length extending from the second location to a first free end of the second resonator module such that the length of the second resonator module is a quarter of the third wavelength.

12. The wind turbine of claim 11, wherein the first resonator module extends at least partially over the second resonator module.

13. The wind turbine of claim 1, wherein the wind turbine comprises a main tower and a nacelle supported by the main tower, and wherein the component is the main tower of the wind turbine.

14. The wind turbine of claim 13, wherein the resonator module is operably coupled to the main tower such that the resonator module is arranged to move around a vertical axis of the main tower as the nacelle yaws.

15. The wind turbine of claim 13, wherein the first location is at the anti-node of the main tower which is closest to the nacelle when the wind turbine is vibrating at the first resonant frequency.

16. The wind turbine of claim 1, wherein the wind turbine comprises a wind turbine blade, and wherein the component is the wind turbine blade.

17. The wind turbine of claim 16, wherein the first location is at the anti-node of the blade which is closest to the blade root when the blade is vibrating at the first resonant frequency.

18. The wind turbine of claim 1, wherein the partial sine wave motion is approximately half of the first wavelength.

19. The wind turbine of claim 1, wherein the first length of the resonator module extends in a direction along a surface of the component.

20. A method of installing a resonator module on a wind turbine, the wind turbine comprising a vibration source and a component arranged to receive a vibration from the vibration source, the method comprising:

identifying a first resonant frequency of the component;

providing a resonator module arranged to vibrate with a first wavelength when excited at the first resonant frequency, the resonator module having a first coupling location and a first free end, wherein the resonator module extends from the first location to the first free end such that a length of the resonator module from the first location to the first free end is a quarter of the first wavelength to reflect a partial sine wave motion of the first wavelength from the first free end of the resonator module back to the component at the first location; and operably coupling the resonator module to the component at the first coupling location.

21. The method of claim 20, wherein identifying a first resonant frequency of a component of the wind turbine comprises performing a numerical simulation of the wind turbine.

22. The method of claim 21, wherein performing the numerical simulation comprises calculating a position of an anti-node at the first resonant frequency, and wherein the coupling comprises coupling the resonator module to the component at the anti-node.

* * * * *